US012144095B2

(12) United States Patent
Kolheb et al.

(10) Patent No.: US 12,144,095 B2
(45) Date of Patent: Nov. 12, 2024

(54) MICROWAVE REFLECTIVE PANEL, ELEMENTS COMPRISING SUCH A PANEL, AND METHOD FOR OBTAINING THEM

(71) Applicant: SCHOTT VTF, Troisfontaines (FR)

(72) Inventors: Benoit Kolheb, Reding (FR); Sébastien Gasnier, Brumath (FR)

(73) Assignee: SCHOTT VTF, Troisfontaines (FR)

( * ) Notice: Subject to any disclaimer, the term of this patent is extended or adjusted under 35 U.S.C. 154(b) by 868 days.

(21) Appl. No.: 17/276,663

(22) PCT Filed: May 28, 2019

(86) PCT No.: PCT/EP2019/063713
§ 371 (c)(1),
(2) Date: Mar. 16, 2021

(87) PCT Pub. No.: WO2020/078593
PCT Pub. Date: Apr. 23, 2020

(65) Prior Publication Data
US 2022/0039220 A1 Feb. 3, 2022

(30) Foreign Application Priority Data
Oct. 15, 2018 (EP) .................................... 18306352

(51) Int. Cl.
*H05B 6/76* (2006.01)

(52) U.S. Cl.
CPC .................................. *H05B 6/766* (2013.01)

(58) Field of Classification Search
CPC .......... H05B 6/766; H05B 6/763; H05K 9/00; B32B 17/10036
See application file for complete search history.

(56) References Cited

U.S. PATENT DOCUMENTS

| | | | | |
|---|---|---|---|---|
| 4,010,343 A * | 3/1977 | Tanaka | H05B 6/763 219/743 |
| 5,981,927 A * | 11/1999 | Osepchuk | H05B 6/766 174/386 |
| 2018/0054860 A1 | 2/2018 | Kim et al. | |

FOREIGN PATENT DOCUMENTS

| | | | | |
|---|---|---|---|---|
| DE | 37 14 122 A1 | 11/1988 | |
| FR | 2 484 397 A1 | 12/1981 | |
| GB | 2 322 276 A | 8/1998 | |
| JP | 2001237061 A * | 8/2001 | H05B 6/766 |
| JP | 2005273977 A * | 10/2005 | H05B 6/763 |

OTHER PUBLICATIONS

Jul. 26, 2019 International Search Report issued in International Patent Application No. PCT/EP2019/063713.
Jul. 26, 2019 Written Opinion of the International Searching Authority issued in International Patent Application No. PCT/EP2019/063713.

* cited by examiner

*Primary Examiner* — Thien S Tran
(74) *Attorney, Agent, or Firm* — Oliff PLC

(57) ABSTRACT

A panel for glazing including a rigid support, substantially transparent to radiation in the visible range, and including at least one surface, including a periphery, and one or more edges, the panel includes a metallic fabric stretched over the at least one surface. Also, a glazing including such a panel, a sealing device of a heat treatment chamber including such a glazing, a heat treatment device using microwaves including such devices, and methods for producing the panel, the glazing, the sealing device and the heat treatment device.

15 Claims, 1 Drawing Sheet

MICROWAVE REFLECTIVE PANEL, ELEMENTS COMPRISING SUCH A PANEL, AND METHOD FOR OBTAINING THEM

OBJECT OF THE INVENTION

The present invention relates to a microwave absorbing and/or reflecting panel, to a glazing and a sealing means for an oven using microwaves, comprising such a panel, a method of obtaining such a panel, glazing and sealing means.

STATE OF THE ART

Microwaves are electromagnetic radiations, used in industry in many technical fields. They are also used daily by professionals or private individuals, in the field of household appliances, and more particularly heat treatment devices, such as ovens.

There are ovens commonly called "microwaves", because they use only microwave radiation for heating and food cooking rapidly, and so-called "mixed" or "combination" ovens, because they use microwaves and one or more other sources of heat production, such as an electrical resistance or infrared source, as opposed to so-called "traditional" ovens that use only one type of heat source, such as gas or electricity.

The ovens, using microwaves, generally include a cooking chamber, which confines the radiation, and some means for sealing an opening through which the products to be heated are placed in the oven, which includes, or usually is a door, capable of limiting or preventing the escape of microwaves from the chamber. Generally, the door includes glazing that is not, or only slightly, transparent to microwaves through the use of shielding.

Typically, the means of shielding the glazing comprises or consists of a network of conductors forming a mesh, which has the advantage of maintaining a certain optical transparency, within the visible range, and a certain opacity to microwaves. The mesh size of such a network is generally between 1 and 2 mm, which shows 10% of the wavelength of the microwaves used in an oven, which have a wavelength of 12 cm for a frequency generally set at 2.5 GHz in most ovens. This enables about 90% of the microwaves generated in the oven chamber to be reflected.

The shielding means may be a metallic grid, attached to the metal part of the microwave oven door frame with enamel or paint, as described in DE3714122, or a metallic fabric, arranged between an outer and an inner glass pane, with the space joined with silicone, or an expanded metal plate, obtained by shearing and simultaneously stretching a metal plate to form a metallic fabric having a hexagonal or diamond pattern, as described in JP 2005273977, or a metallic fabric, woven of conductive wires, as described in US2018054860.

The shielding means may also be a web of conductors, obtained by screen printing on a glass support, which is covered with a transparent or colored protective enamel layer coated with electrically conductive and optically transparent layers, as described in FR2484397.

Even though the glazing of microwave ovens is substantially transparent to radiation in the visible range, this transparency is greatly reduced by the presence of the microwave shielding, namely the metallic grid, and it is very difficult for the user to see the interior of the oven chamber easily. Moreover, not only does such a glass pane have a completely unattractive appearance, it also gives the oven, which includes such a glazing, a "microwave oven" connotation, which may be negative for some users, especially in the case of combination ovens.

However, in order to provide excellent visibility to users and to attenuate the microwave radiation for such combination ovens, GB2322276 describes the combined use of a metallic fabric, reflecting microwave energy, with a microwave-absorbing plastic film.

SCOPE OF THE INVENTION

The present invention is intended to provide a microwave absorbing and/or reflecting panel, a glazing comprising such a panel, and a method of manufacturing such a panel and glazing, which do not have the disadvantages of the state of the art.

The present invention is intended to provide an alternative to existing state of the art solutions.

The present invention is intended to provide a microwave absorbing and/or reflecting panel and a glazing comprising such a panel, the final aesthetic appearance of which is improved.

The present invention is also intended to provide a method of manufacturing a panel and a glazing, in particular for ovens, that is quick and easy to implement.

SUMMARY OF THE INVENTION

The present invention relates to a panel for glazing comprising a rigid support, substantially transparent to radiation in the visible range, and comprising at least one surface, comprising a periphery, and one or more edges, wherein the panel comprises a metallic fabric stretched over at least one of the surfaces.

According to preferred embodiments of the invention, the panel according to the invention comprises at least one or any suitable combination of the following characteristics:

- the stretched metallic fabric comprises a stretch percentage, in the weft and/or warp direction, comprised between 0.01 and 5% relative to its "resting" state,
- the metallic fabric is stretched to a tension comprised between 5 and 25 Newtons,
- the metallic fabric is attached, using attaching means, to all or part of the periphery of at least one surface of the support,
- the stretched metallic fabric (5) comprises square meshes with a warp distance 'w' and/or weft distance 'w' comprised between 120 and 220 μm, The present invention also relates to a glazing comprising at least one panel according to the invention.

The present invention also relates to sealing means of a heat treatment chamber comprising the glazing according to the invention, and a frame, attached to and/or surrounding the glazing, the frame being in electrical contact with the metallic fabric and comprising, or interacting with, hinging means enabling the sealing of the heat treatment chamber.

The present invention also relates to a heat treatment device using microwaves comprising a heat treatment chamber and the sealing means according to the invention.

The present invention also relates to a method of making a panel according to the invention, comprising the steps of taking a rigid support substantially transparent to radiation in the visible range, and comprising at least one surface, a periphery, and one or more edges, taking a metallic fabric in a "resting" state, stretching it from the "resting" state to a "stretched" state, and keeping it taut, setting the metallic fabric, by attaching means, kept taut, on all or part of at least one surface, so as to keep it taut on the surface.

According to preferred embodiments of the invention, the method of making the panel according to the invention includes at least one, or any appropriate combination, of the following features:

- the step of stretching the metallic fabric is in the weft and/or warp direction, the stretching of the metallic fabric being comprised between 0.01 and 5% relative to a "resting" state,
- the method further comprises a step of attaching one or more separator elements to the metallic fabric, delimiting a plurality of areas of stretched metallic fabric, and a step of cutting the stretched metallic fabric along the separators.

The present invention also relates to a method of making a glazing according to the invention, comprising the steps of taking a panel, made by carrying out the method of producing the panel according to the invention, taking or producing one or more coatings, taking or making one or more plates of the same nature and/or features and/or dimensions as that/those of the support, covering all or part of the metallic fabric or all or part of the support surface(s) not covered by the metallic fabric, or both at the same time, with the coating(s), with the plate(s), or both with one or more coatings and one or more plates, the coating(s) being arranged adjacent or superimposed to each other, the plate(s) being arranged adjacent or superimposed to each other, or the coating(s) being arranged adjacent or superimposed to the plate(s), the coating(s) being arranged on the plate(s), or inversely, the plate(s) being arranged on the coating(s).

The present invention also relates to a method of producing sealing means of heat treatment chamber, according to the invention, comprising the steps of taking a glazing, produced by carrying out the method of producing a glazing according to the invention, taking a frame, setting the frame on the glazing, at the level of, or on, the attaching means of the metal fabric on the support and/or on one or more edges of the support so that the frame is in electrical contact with the metallic fabric.

The present invention also relates to a method of making a heat treatment device using microwaves comprising the steps of taking a cooking chamber, taking the sealing means, made by carrying out the method of making the sealing means according to the invention, and connecting the sealing means to the chamber.

DETAILED DESCRIPTION OF THE INVENTION

In the remainder of the description and claims, the term "length" is used to describe the largest measurement on one side of any geometric shape, for example the large radius of an ellipsoid or ellipse, the base or height of a triangle, the length of a trapezoid or rectangle. The term "width" is used to describe the smallest of the measurements, for example the small radius of an ellipsoid or ellipse, the base or height of a triangle, the width of a trapezoid or rectangle, and the terms "length" and "width" can be used interchangeably, for example to refer to the measurement of the radius of a disc, the side of a square.

Figure 1:
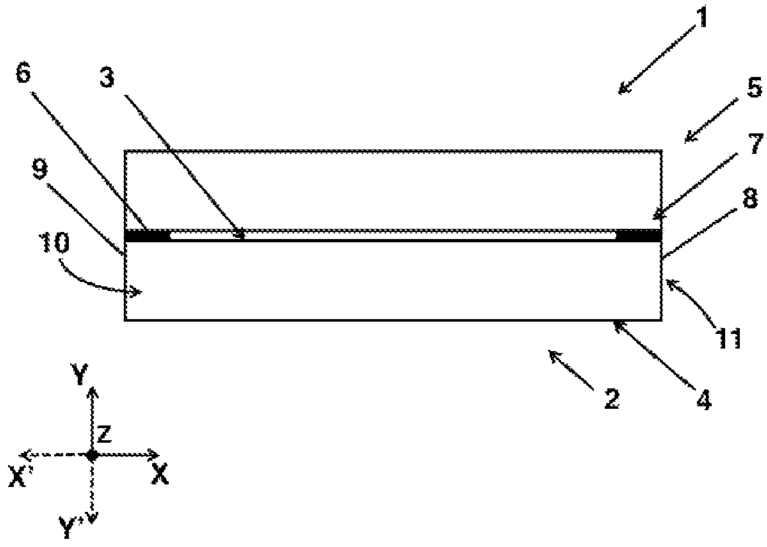
FIG. 1 is a schematic representation of a side view of a panel according to the invention.

The terms "front", "rear", "top" and "bottom" refer to the normal position of the panel according to the invention, and its constituent elements, as shown in FIG. 1.

The panel 1 according to the invention comprises a support 2, which is rigid, substantially inflexible. It has a mechanical resistance, to bending and/or torsional stresses, sufficient not to deform under the action of bending and/or torsional force.

The support 2 has a shape, thickness and dimensions that are adequate and suitable, or compatible, with the end use of the panel 1, or elements that comprise such a panel 1.

The support 2 has at least one continuous and substantially flat upper surface 3, preferably also a continuous and substantially flat lower surface 4 opposite the upper surface 3 (FIG. 1).

The support 2 preferably has a cross-section, thus in the plane formed by the surface 2 or the surface 3, in the X-Z plane, of circular, elliptical, polygonal, trapezoidal or quadrilateral shape, preferably a diamond, square or rectangular cross-section. Preferably, the support 2 has a longitudinal section, thus in the X-Y plane, and/or a cross-section, thus in the Y-Z plane, perpendicular to the plane formed by the surface 2 or the surface 3, circular, elliptical or polygonal, trapezoidal or of a quadrilateral, advantageously a square or rectangular section, of a trapezoid or a rectangular trapezoid.

The support 2 has at least a first lateral edge 8, and, in the embodiments wherein it has a parallelepipedal cross-section and/or longitudinal section, for example square or rectangular, it has a second lateral edge 9, opposite the first lateral edge 8, a front edge 10 and a rear edge 11, opposite the front edge 10.

The support 2 is made of an inert material, preferably at least thermally inert, advantageously also physically and chemically inert to the material(s) of which one or both of the surfaces 2 and 3 is/are covered or in contact.

The support 2 is preferably transparent, or partially transparent, optically in the visible range, in its thickness and/or width and/or length. It can be sandblasted and/or screen-printed and/or colored on part of one or both the surfaces 3 and 4.

The support 2 is preferably made of or comprises plastic, glass, crystalline or semi-crystalline material, ceramic or glass-ceramic.

In a preferred embodiment of the invention, the support 2 is glass, preferably a transparent or soda-lime colored glass, possibly with various layers, such as antibacterial, anti-reflective, such as the type known under the Matelux® brand name, chrome-plated, with low-emissivity, for example the type known as Planibel Clear or Planibel low-E IsoComfort, marketed by AGC, or a borosilicate, for example known under the Borofloat® 33 brand name. Preferably, the glass is high in $SiO_2$, preferably between 69% and 81% by weight and with a light transmission of up to 90%. The glass may have undergone heat treatment such as hardening, annealing, tempering or bending beforehand.

The panel 1 according to the invention comprises microwave shielding means comprising a metallic fabric 5, attached on all or part of one of the surfaces 3 or 4, preferably on both the surfaces 3 and 4 of the support 2, the metallic fabric 5 being in constrained form. The metallic fabric 5 is stretched over the surface(s) 3, 4. It is in stretched form between the edges 8, 9, 10, 11 of the support 2.

In contrast to the state-of-the-art solutions in which the metallic fabrics or fabric used as microwave shielding, are arranged on a support in a “resting” state, namely unconstrained or not tensioned, the metallic fabric 5 in the present invention is in an elongated form on the support 2. On the support 2, it undergoes the action of one or more traction forces, continuously, while it covers the surface or surfaces 3, 4.

Possibly, the metallic fabric 5 may protrude from one or more edges 8 of the support 2, and also cover the surface(s), but preferably in a non-tensioned form, namely in the resting state.

Thus, the panel 1 according to the invention possesses barrier or microwave reflection properties, preserved or improved, while providing improved optical transparency in the visible range.

The metallic fabric 5 according to the invention is deformable, in particular it is elastically extensible. It has an adequate stretching capacity, enabling it to pass from its “resting” state, when it is not installed on the support 2, to its “stretched” state once it covers surface(s) 3, 4. It also possesses elasticity properties that enable it to regain its shape and dimension, at least partially, after having lost them by extension. As a result, because of its elasticity, the metallic fabric 5 is stretched over the support 2, and within the panel 1 is subjected to the tension forces created by the tendency of the metallic fabric 5 to return to its resting state.

Preferably, it has a Young’s modulus of between 190 and 230 GPa.

Preferably, it is obtained by weaving metallic or metal-covered wires or fibers, fibers made of or comprising one or more metals, or one or more alloys of suitable metals, advantageously selected from silver, chromium, platinum, copper, stainless steel, their alloys or a mixture thereof.

The metal fibers have a warp diameter “d”, and a weft diameter “d'”, “d” and “d'” potentially the same or different between weft and warp, spaced in warp by a distance«w» and in weft by a distance«w'», with «w» and «w'» potentially the same or different between weft and warp.

The metal fibers can be interlaced in any suitable weave, for example in a plain, twill or satin weave.

Preferably, in the panel 1, the metallic fabric 5 is stretched by 0.01 to 5% from its resting state. The tension exerted on the metallic fabric 5 for such stretching also depends on the nature of the wires comprising the metallic fabric 5, their stretchability and elasticity, and thus on the overall stretchability and elasticity of the metallic fabric 5.

It is preferably stretched in at least one direction, advantageously in all directions, namely, for a metallic fabric 5 of substantially square or rectangular shape, depending on its width or weft (plane Z-Z' of FIG. 1), its length or warp (plane X-X' of FIG. 1), but preferably not in its thickness (plane Y-Y' of FIG. 1). Since it can adopt identical or compatible shapes with those of the panel 1, the metallic fabric 5 is stretched, and held taut on the surface(s) 3, 4 of the support 2, in all directions of its width and length, regardless of its shape.

It is possible to provide that the metallic fabric 5 is stretched differently on its surface 3, 4, thus in the plane that it forms, the X-Z plane, for example according to a first stretching level for one or more portions of its periphery, with a central portion unstretched or stretched according to a second level of stretching, lower than the first level of stretching. However, and preferably, it is stretched homogeneously over its entire surface from its central portion to its periphery.

The shape of the openworks, or meshes, of the stretched metallic fabric 5 in the panel 1, and their sizes or dimensions «w» and «w'», in stretched form, is chosen according to the type of microwave to be absorbed or reflected. Preferably, the metallic fabric 5 has the same mesh shape in its stretched state as in its resting state. However, it is possible that the mesh may be deformed between these two states, a deformation obtained by a difference in stretch over its width and/or length.

Preferably, the meshes are stretched between 50 and 100%, namely the meshes have dimensions «w» and/or «w'» that are one and a half or two times those of the resting metallic fabric 5.

The stretched mesh can be a rectangular or diamond-shaped mesh, but it is preferably square, because such a mesh allows to obtain the most aesthetic and uniform transparency of the panel 1, and thus of the device that comprises it.

Figure 2:
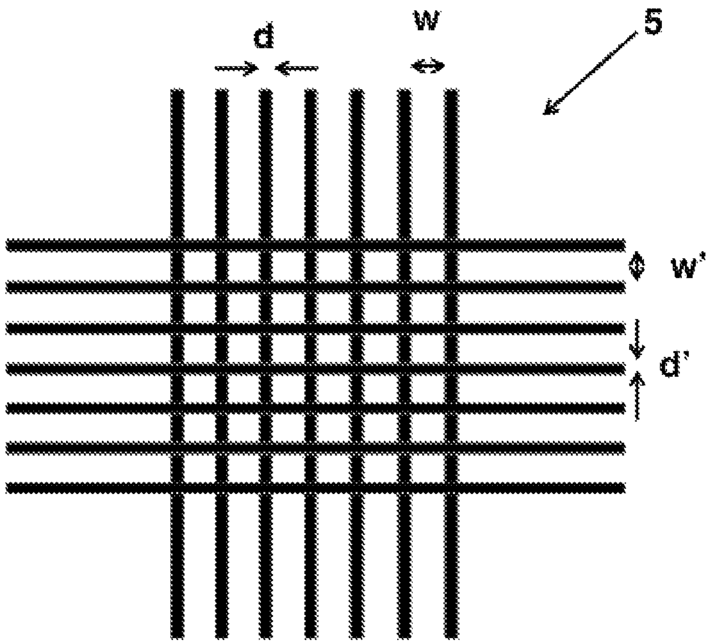
FIG. 2 is a schematic representation of a top view of a particular embodiment of metallic fabric, in stretched form, according to the invention.

Preferably, the resting metallic fabric 5 comprises square meshes with dimensions «w» and «w'» comprised between 60 and 100 μm. Preferably, the metal fibers are made of stainless steel with an identical diameter «d» and «d'» comprised between 200 to 300 μm. Preferably, the percentage of openworks varies from 35 to 50% and having a fineness between 30 and 120 mesh/inch, namely between 30 and 120 meshes per 25.4 mm. When stretched, the metallic fabric 5 comprises square meshes (FIG. 2) with dimensions «w» and «w'» of between 120 and 220 μm. Preferably, the metal fibers have identical «d» and «d'» diameters, ranging from 50 to 100 μm.

Preferably, the tension exerted on the metallic fabric 5 to stretch it, and keep it taut on the support 2, is 5 to 25 Newtons.

As an example, the metallic fabric 5 according to the invention has a fineness of about 43 mesh/inch (43 meshes per 25.4 mm), with 46% openworks, and comprising square meshes with a warp «d» and weft «d'» dimension of about 160 μm, formed by stainless steel wires having a warp «w» and weft «w'» diameter of about 70 μm.

The metallic fabric 5, in a stretched form, is attached, continuously or discontinuously, to the surface or surfaces 3, 4, by a means of attaching 6, an adhesive, or a glue, compatible with the nature of the metallic fabric 5, the support 2, the final device incorporating the panel 1 according to the invention and its final use. Preferably, it is an adhesive with a good resistance when subjected to high temperatures, of about 250° C. It can be a mono-component silicone glue, an acetic or neutral base silicone glue.

The metallic fabric 5 is preferably attached on all or part of the periphery 7 of one of the surfaces 3 or 4 (FIG. 1), preferably by a few millimeters, for example 5 to 25 mm, from the edge 8 of the support 2, possibly also on one or more edges 8. This has the advantage of rendering invisible the points or areas of gluing of the metallic fabric 5 in the final device integrating the panel 1 according to the invention.

The panel 1 according to the invention is preferably used in the field of household appliances, advantageously as glazing of a domestic or professional household appliance, even more advantageously as glazing of a door of a microwave or combination oven.

The glazing according to the invention comprises the panel 1 according to the invention. It may further comprise one or more coatings, or films, superimposed or arranged adjacent to each other, covering all or part of the metallic fabric 5 and/or the surface(s) 2, 3, or portions of the surfaces 2, 3 of the support 2, not covered by the metallic fabric 5, preferably with the exception of the metallic fabric 5 protruding from the edge(s) 8 of the support 2.

The coatings or films have adequate dimensions and thicknesses and preferably special properties that are advantageously related to the end use of the glazing or the device or means comprising the glazing. It may be a protective coating, preferably thermal protection, and/or anti-condensation.

The panel 1 may also include a transparent plate, or sheet, of the same nature, characteristics and dimensions as those forming the support 2, placed on the metallic fabric 5, on the covering(s) covering the metallic fabric 5 and/or on the surface(s) 3, 4 of the support 2.

Thus, if the metallic fabric 5 covers only one of the surfaces 3 or 4 of the support 2, the other surface may be covered by one or more coatings arranged adjacent or superimposed to each other or by one or more plates arranged adjacent or superimposed to each other, or by a combination of one or more coatings and one or more plates, the plate(s) being arranged adjacent to or overlying the coating(s) or coating(s) covering the plate(s).

If the metallic fabric 5 completely covers one or both surfaces 3, 4 at the same time, a first or first set of coverings, or a first or first set of plates, may cover the entire metallic fabric 5, and the coating(s) may penetrate the mesh of the metallic fabric 5, a second or second set of coverings, or a second set of plates, then able to cover the first or first set of coverings or the first or first set of plates. Thus, the glazing may be a multilayer product, comprising either alternating coatings and plates, or one or more coatings on one or more plates, or conversely, one or more plates on one or more coatings.

If the metallic fabric 5 partially covers one or both surfaces 3, 4 at the same time, the coating(s) or plate(s) may cover either the metallic fabric 5 or the surface 3 and/or 4 without the metallic fabric 5, or both at the sometime. If a first or first set of coverings, or a first or first set of plates, covers only part of the metallic fabric 5, a second or second set of coverings, or a second or second set of plates may cover the remainder of the metallic fabric 5, and possibly also the first or first set of coverings or first or first set of plates. It is also possible to provide that a third or third series of coverings, or one or third series of plates, may cover all or part of the first series and/or second series of coverings and/or plates.

The panel 1 according to the invention is preferably used as a means of sealing a heat treatment chamber, for example as a door of a microwave or mixed oven.

The sealing means according to the invention comprise the glazing according to the invention and a frame, either one-piece or made of an assembly of frame elements, attached to or surrounding the glazing, and comprising or interacting with means of hinging enabling the sealing of the heat treatment chamber. The frame has all the shapes and dimensions adapted to the chamber it is to seal, to the glazing and to the panel 1 according to the invention.

Preferably, the frame is positioned at the level, preferably, covers the means of attaching 6 of the metallic fabric 5 on the support 2, thus the periphery 7 of one of the surfaces 3 or 4 of the support 2, which has the advantage of making the means of attaching 6 invisible. The frame can also cover one or more edges of the glazing and thus one or more edges 8 of the panel 1, possibly including the portion(s) of the metallic fabric 5 protruding from the support 2.

The frame is made of, or includes, all suitable materials compatible with its end use, in particular its use as an oven door.

Preferably, the frame is in electrical contact with the metallic fabric 5, at least with its portion covering the surface(s) 3, 4 and/or that protruding from or covering one or more edges 8 of the support 2. This electrical contact has the advantage of dissipating the microwave radiation.

The heat treatment device according to the invention comprises a cooking chamber and the sealing means according to the invention. It is preferably a so-called microwave or combination oven.

The object of the present invention also is a method of making a panel 1 according to the invention.

The method comprises the step of taking, or making, the support 2 and the metallic fabric 5 as described above.

Preferably, the metallic fabric 5 is placed in its resting state on a table provided with stretching means, for example a table provided with jaws all around its periphery, and the fabric is attached in these stretching means.

The metallic fabric 5 is stretched in at least one direction, preferably in all directions, namely over its length and/or width, and is held in a stretched state, preferably by 0.01 to 5% in relation to its resting state.

Preferably, the stretching of the metallic fabric 5 is achieved by applying a force of between 5 and 25 Newtons.

The method may also comprise attaching one or more separator elements to the metallic fabric 5, enabling the delimitation of at least one, preferably several areas of stretched metallic fabric 5, and the cutting thereof along the separator(s). This has the advantage that portions of the metallic fabric 5 are available and therefore easier to handle for the implementation of other steps of the method.

The size and dimensions of the separator(s) are a function of those of the support 2 and therefore of the panel 1.

The method includes the step of taking, or making, a support 2 as described above, of placing attaching means 6, on all or part of the periphery 7 of one of the surfaces 3 or 4, preferably a few millimeters from the edges 8 of the support 2, and possibly also on one or more of the edge 8. Preferably, the application of the fasteners 6 should be done with a pneumatic gun, which has the advantage of increased precision and obtaining a better homogeneity of the fasteners 6 on the surface(s) 3, 4.

The tensioned metallic fabric 5 or a portion of it, provided with its separating element(s), is brought into contact with the support 2 provided with the fasteners 6. Preferably, the tensioned metallic fabric 5 or a portion thereof is placed on the support 2. Advantageously, pressure is exerted on the metallic fabric 5 so that the means of attaching 6 penetrate, and preferably pass through, these meshes.

The method also includes a step of removing the separating element(s) from the tensioned metallic fabric 5.

The method may further comprise a step of cutting the metallic fabric 5 protruding beyond the edges 8 of the support 2, preferably leaving a margin from said edges 8, which is a function of the end use of the panel according to the invention. For example, for microwave oven glazing, this margin will be from 5 to 25 mm approximately.

The method of making the glazing according to the invention comprises the step of taking, or making, the panel 1 according to the invention, preferably manufactured according to the method described above, a step of taking, or making, one or more coatings, or films, and/or one or more plates, or sheets, transparent, of the same nature, features and dimensions as those forming the support 2, a step of covering all or part of the metallic fabric 5 and/or all or part of one or more of the surfaces 3, 4 of the support 2 not covered by the metallic fabric (5), using the coating(s) or one or more plates.

Thus, if the metallic fabric 5 covers only one of the surfaces 3 or 4 of the support 2, it is possible to cover the other surface 3 or 4 with one or more coatings arranged adjacent or superimposed to each other, or with one or more plates arranged adjacent or superimposed to each other, or by both one or more coatings and one or more plates, the plate(s) being arranged adjacent to or overlying the coating(s), or the coating(s) overlying the plate(s).

If the metallic fabric 5 completely covers one or both of the surfaces 3, 4 at the same time, it is possible to cover it partially or completely, preferably with the exception of the metallic fabric 5 extending beyond the edges 8 of the support 2, with a first or first set of coatings, or one or first set of plates, and then cover it or them with a second or second set of coatings, or one or more other plates, in order to obtain a multilayer product, comprising either a succession of layers of coatings or a succession of plates, or alternate of coatings and plates, or one or more coatings on one or more plates, or conversely, one or more plates on one or more coatings.

If the metallic fabric 5 partially covers one or both of the surfaces 3, 4 at the same time, it is possible to cover it and/or to cover the surface 3, 4 not covered by the metallic fabric 5, by one or more coatings or by one or more plates. If a first or first series of coatings, or a first or first series of plates, covers only part of the metallic fabric 5, it is possible to cover the resting of the metallic fabric 5, and possibly also the first or first series of coatings, or first or first series of plates, with a second or second series of coatings, or a second or second series of plates. It is also possible to cover all or part of the first series and/or second series of coatings and/or plates with a third or third series of coatings, or one or third series of plates.

The application of the coating(s), film(s), plate(s) or sheet(s) may be done by any suitable method.

The method of producing of the sealing means of a heat treatment chamber, in particular a door of a microwave or mixed oven, comprises the step of taking or producing a glazing according to the invention, preferably manufactured according to the method described above, taking or producing a one-piece frame, or made of an assembly of frame elements, and of attaching the frame to the glazing, preferably at the level of, or on the means of attaching 6 of the metallic fabric 5 to the support 2 and/or one or more edges of the glazing. Preferably, the method further includes a step of taking, or making, a means of hinging and attaching it to the frame, either before or after the frame is installed on the glazing.

The method of making a heat treatment device comprises the step of taking or making a cooking chamber, preferably hermetic or substantially hermetic to microwaves, the step of taking or making the means of sealing according to the invention, preferably made using the method described above, and a step of connecting the means of sealing to the chamber.

The invention claimed is:

1. A panel for glazing comprising a rigid support, transparent to radiation in a visible range, and comprising at least one surface, comprising a periphery, and one or more edges,
- wherein the panel comprises a metallic fabric stretched over the at least one of the surfaces,
- the metallic fabric comprises interlaced warp metal fibers and weft metal fibers, and
- the metallic fabric is elastically extended while being stretched over the at least one of the surfaces.

2. The panel according to claim 1, wherein the stretched metallic fabric comprises a stretch percentage, in at least one of a weft and a warp direction, comprised between 0.01 and 5% with respect to a "resting" state of the metallic fabric.

3. The panel according to claim 1, wherein the metallic fabric is stretched under a tension comprised between 5 and 25 Newtons.

4. The panel according to claim 1, wherein the metallic fabric is attached, by attaching means, on all or part of the periphery of at least one surface of the support.

5. The panel according to claim 1, wherein the stretched metallic fabric comprises square meshes with a warp distance«W», a weft distance«W'», or both a warp distance«W» and a weft distance«w'», comprised between 120 and 220 μm.

6. A glazing comprising at least one panel according to claim 1.

7. Sealing means of a heat treatment chamber comprising the glazing according to claim 6, a frame, at least one of attached to and surrounding the glazing, the frame being in electrical contact with the metallic fabric, and comprising, or interacting with, hinging means enabling the sealing of the heat treatment chamber.

8. A heat treatment device using microwaves comprising a heat treatment chamber and the sealing means according to claim 7.

9. A method of making a panel according to claim 1, comprising steps of:
- taking a rigid support, transparent to radiation in a visible range, and comprising at least one surface, a periphery, and one or more edges,
- taking a metallic fabric in a "resting" state, stretch it from the "resting" state to a "stretched" state, and keeping it taut,
- setting the metallic fabric, kept taut, by attaching means, on all or part of at least one of the surfaces, so as to keep it taut, on at least one of the surfaces.

10. The method according to claim 9, the step of tensioning the metallic fabric is carried out by pulling in at least one of a weft and a warp direction, the stretch of the metallic fabric being comprised between 0.01 and 5% relative to its "resting" state.

11. The method according to claim 9, further comprising a step of attaching, to the metallic fabric, one or more separator elements delimiting a plurality of areas of stretched metallic fabric, and a step of cutting the stretched metallic fabric along the separators.

12. A method of making a glazing according to claim 6, comprising steps of:
- taking a panel made by carrying out a second method comprising steps of:
  - taking a rigid support, transparent to radiation in a visible range, and comprising at least one surface, a periphery, and one or more edges,
  - taking a metallic fabric in a "resting" state, stretch it from the "resting" state to a "stretched" state, and keeping it taut,
  - setting the metallic fabric, kept taut, by attaching means, on all or part of at least one of the surfaces, so as to keep it taut, on at least one of the surfaces;
- taking or making one or more coatings,
- taking or making one or more plates of at least one of a same nature, same features, and same dimensions as the support,
- covering all or part of the metallic fabric or all or part of the surface(s) of the support not covered by the metallic fabric, or both at a same time, with the coating(s), with the plate(s), or both, with one or more coatings and one or more plates, the coating(s) being arranged adjacent or superimposed to each other, the plate(s) being arranged adjacent or superimposed to each other, or the coating(s) being arranged adjacent or superimposed to the plate(s), the coating(s) being arranged on the plate(s), or inversely, the plate(s) being disposed on the coating(s).

13. A method of making sealing means for a heat treatment chamber, according to claim 7, comprising steps of:

taking a glazing, carried out by carrying out a second method comprising steps of:

taking a panel made by carrying out a third method comprising steps of:

taking a rigid support, transparent to radiation in a visible range, and comprising at least one surface, a periphery, and one or more edges, taking a metallic fabric in a "resting" state, stretch it from the "resting" state to a "stretched" state, and keeping it taut, setting the metallic fabric, kept taut, by attaching means, on all or part of at least one of the surfaces, so as to keep it taut, on at least one of the surfaces;

taking or making one or more coatings, taking or making one or more plates of at least one of a same nature, same features, and same dimensions as the support, covering all or part of the metallic fabric or all or part of the surface(s) of the support not covered by the metallic fabric, or both at a same time, with the coating(s), with the plate(s), or both, with one or more coatings and one or more plates, the coating(s) being arranged adjacent or superimposed to each other, the plate(s) being arranged adjacent or superimposed to each other, or the coating(s) being arranged adjacent or superimposed to the plate(s), the coating(s) being arranged on the plate(s), or inversely, the plate(s) being disposed on the coating(s);

taking a frame, setting the frame to the glazing, at the level of, or on the attaching means of the metallic fabric on the support and/or on one or more edges of the support so that the frame is in electrical contact with the metallic fabric.

14. A method of making a heat treatment device using microwaves comprising steps of:

taking a cooking chamber, taking the sealing means, made by carrying out the method according to claim 13, connecting the sealing means to the chamber.

15. The panel according to claim 1, wherein the warp metal fibers and weft metal fibers are interlaced in a plain weave, a twill weave, or a satin weave.

* * * * *